B. McPHILLIAMY.
FRONT HUB AND SPINDLE CONSTRUCTION FOR AUTOMOBILES.
APPLICATION FILED MAY 29, 1919.
1,374,597.
Patented Apr. 12, 1921.
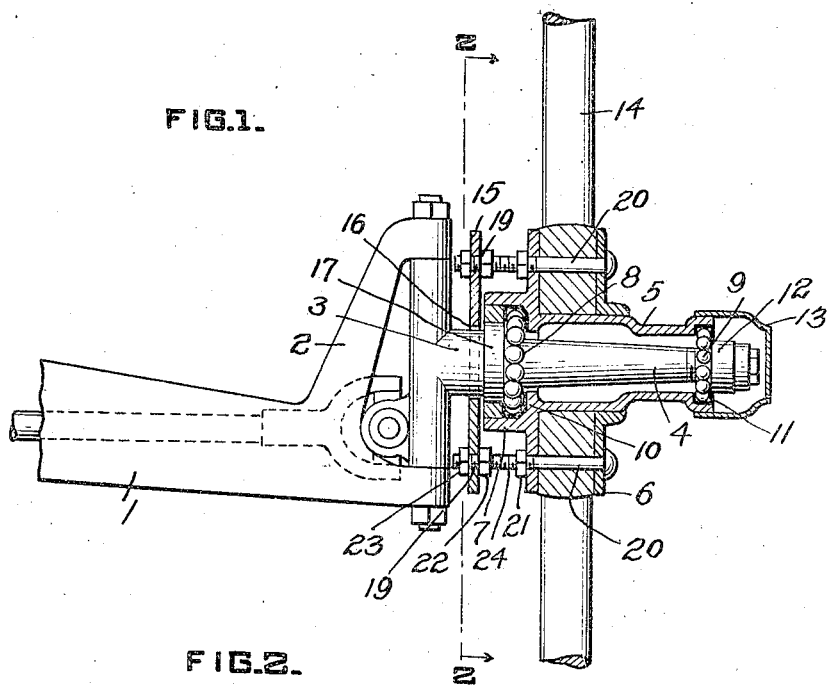
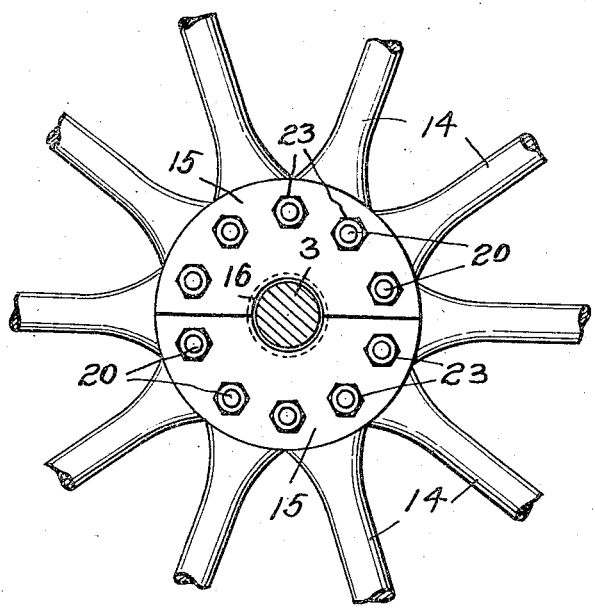
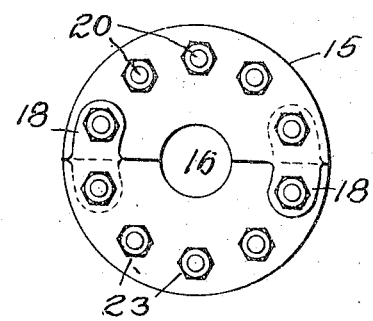
WITNESSES
INVENTOR

UNITED STATES PATENT OFFICE.

BURTON McPHILLIAMY, OF VANDERGRIFT, PENNSYLVANIA.

FRONT HUB AND SPINDLE CONSTRUCTION FOR AUTOMOBILES.

1,374,597.  Specification of Letters Patent.  Patented Apr. 12, 1921.

Application filed May 29, 1919. Serial No. 300,595.

*To all whom it may concern:*

Be it known that I, BURTON McPHILLI-AMY, a citizen of the United States, residing at Vandergrift, in the county of Allegheny and State of Pennsylvania, have invented certain new and useful Improvements in Front Hub and Spindle Constructions for Automobiles, of which the following is a specification.

My invention relates to a front hub and spindle assembly for automobiles, and more particularly to means employed in connection with the hub and spindle construction for preventing the wheel or wheels from becoming detached from the hub in the event of a spindle breaking.

The prime object of my invention is to provide simple and efficient means for preventing the front wheels from becoming detached in case the spindle should break.

In the accompanying drawing, which illustrates an application of my invention,

Figure 1 is a part elevational view and a part sectional view of a front hub and spindle assembly embodying my invention;

Fig. 2, a part elevational and a part sectional view, the section being taken on line 2—2 of Fig. 1; and Fig. 3, a front elevational view showing a modified form of apertured plate or disk employed.

Referring to the drawings, 1 designates the front axle of an automobile, 2 the yoke, and 3 the spindle body bushing secured to the yoke 2 by a spindle bolt in the usual manner.

Surrounding the spindle is a hub 5 which, as illustrated, is of the usual construction, and includes vertically extending hub flanges 6 and horizontally extending hub flanges 7. Large and small ball bearings 8 and 9 are provided, and 10 designates a ball retainer for the balls 8, the balls 9 being maintained in position by means of the ball retainer 11 and adjusting cone 12. 13 designates the hub cap of usual and well known form, and 14 the spokes.

The parts above described form no part of the present invention, and may be varied somewhat from the construction illustrated.

Disposed between the outer edge of the annular flange 7 of the hub and the spindle bushing body 3, I provide a centrally apertured disk or plate member 15. The central aperture 16 of this disk is designed to encircle an extension 17 of the spindle bushing 3. Member or element 15 may be a divided disk or plate of the form shown by Fig. 2, or of a construction shown by Fig. 3. In this latter form I have shown overlapping ears or lugs 18 formed on the respective halves constituting the disk. In both forms, the divided element 15 is provided with a plurality of bolt receiving openings 19, said openings being adapted to receive a series of bolts 20.

Bolts 20 are passed through the vertically extending flanges 6 of the hub and through the apertures in the element 15, and each of the bolts preferably carries three nuts 21, 22 and 23 adjustably mounted on the threaded portion 24 of each of the bolts. The function of nuts 22 and 23 is to maintain the element 15 in the desired position relatively to the outer edge of the annular flange 7 of the hub. As illustrated, element 15 is disposed only a slight distance from the edge of the annular flange.

It will be understood that should the spindle 4 break, the wheel will not become disconnected from the hub and spindle assembly, due to the fact that element 15 cannot pass over the annular flange 7, thereby preventing the wheel from flying off or becoming disconnected from the said assembly. In the construction shown, it will be seen that the device may be attached to wheels now generally in use, the only change necessary being the substitution of long bolts 20 for the short bolts or rivets ordinarily used in this type of wheel.

What I claim is:

1. The combination with a spindle having a flange thereon between its ends, of a wheel on one end of the spindle having annular plates at its hubs, bolts passing through said plates, and nuts on the bolts serving to hold the plates in position, and an apertured plate carried at the ends of said bolts and surrounding the other end of the spindle, whereby the flange is positioned between said plate and the wheel.

2. The combination with a spindle having a flange thereon between its ends, of a wheel on one end of the spindle having a hub formed of spoke engaging members, bolts passing through said members for clamping the spokes in position, nuts on said bolts to hold the members in clamping position, and a divided apertured disk carried on the ends of said bolts and surrounding the other end of the spindle, whereby the flange is positioned between the apertured disk and the wheel.

3. The combination with a spindle having a flange thereon between its ends, of a wheel on one end of the spindle having a hub formed of spoke engaging members, bolts passing through said members for clamping the spokes in position, nuts on said bolts to hold the members in clamping position, and a divided apertured disk carried on the ends of said bolts and surrounding the other end of the spindle, whereby the flange is positioned between the apertured disk and the wheel, the sections of said disk having ears for connecting them, said bolts also passing through the ears.

In testimony whereof, I affix my signature in presence of two witnesses.

BURTON McPHILLIAMY.

Witnesses:
   Lois Wineman,
   Sue B. Fritz.